United States Patent
Hirokawa

(10) Patent No.: US 7,420,714 B2
(45) Date of Patent: Sep. 2, 2008

(54) METHOD FOR MONITORING PERFORMANCE OF IMAGE FORMING APPARATUS

(75) Inventor: Masashi Hirokawa, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 837 days.

(21) Appl. No.: 10/742,349

(22) Filed: Dec. 19, 2003

(65) Prior Publication Data

US 2004/0130755 A1    Jul. 8, 2004

Related U.S. Application Data

(63) Continuation of application No. 09/159,217, filed on Sep. 23, 1998, now Pat. No. 6,697,172.

(30) Foreign Application Priority Data

Sep. 26, 1997    (JP)    ................................. 9-278036

(51) Int. Cl.
*G06F 15/00* (2006.01)
*G06F 15/16* (2006.01)

(52) U.S. Cl. ...................... 358/400; 709/206

(58) Field of Classification Search ................ 358/400, 358/404, 1.15, 1.13, 1.14, 468; 455/414.1, 455/405, 410; 717/120, 175; 709/206; 726/2, 726/5

See application file for complete search history.

(56) References Cited

U.S. PATENT DOCUMENTS

| | | | |
|---|---|---|---|
| 4,924,383 A | 5/1990 | Suzuki | |
| 4,965,676 A | 10/1990 | Ejiri et al. | |
| 5,226,074 A | 7/1993 | Han | |
| 5,280,366 A | 1/1994 | Araki | |
| 5,335,085 A | 8/1994 | Nakatsuma | |
| 5,339,169 A | 8/1994 | Meguro et al. | |
| 5,359,429 A * | 10/1994 | Takahashi | 358/439 |
| 5,392,136 A * | 2/1995 | Nobuta et al. | 358/444 |
| 5,396,341 A | 3/1995 | Takahashi et al. | |
| 5,552,901 A * | 9/1996 | Kikuchi et al. | 358/468 |
| 5,640,248 A | 6/1997 | Hirokawa | |
| 5,651,112 A | 7/1997 | Matsuno et al. | |
| 5,684,947 A | 11/1997 | Horie | |
| 5,757,514 A | 5/1998 | Shibata et al. | |
| 5,784,174 A | 7/1998 | Fujino et al. | |
| 5,898,763 A | 4/1999 | Azuma et al. | |
| 5,907,410 A | 5/1999 | Ohtake | |

(Continued)

FOREIGN PATENT DOCUMENTS

DE    4340602 A1    12/1996

(Continued)

*Primary Examiner*—Saeid Ebrahimi Dehkordy
(74) *Attorney, Agent, or Firm*—Cooper & Dunham, LLP

(57) ABSTRACT

A facsimile apparatus which is operatively connected to a central data processing apparatus includes a performance measuring mechanism, a memory, a data reading mechanism, and a data transfer mechanism. The performance measuring mechanism measures at least one performance related to facsimile operations. The memory that stores data of measurements on the at least one performance measured by the performance measuring mechanism. The data reading mechanism that receives a request for data transmission and that, in response to the request, reads the data of measurements on the at least one performance stored in the memory. The data transfer mechanism that transfers the data read by the data reading mechanism to the central data processing apparatus.

16 Claims, 6 Drawing Sheets

U.S. PATENT DOCUMENTS

| | | | |
|---|---|---|---|
| 6,061,724 A | 5/2000 | Ries et al. | |
| 6,065,036 A | 5/2000 | Hisatake | |
| 6,072,599 A | 6/2000 | Oba et al. | |
| 6,119,142 A | 9/2000 | Kosaka | |
| 6,374,291 B1 | 4/2002 | Ishibashi et al. | |
| 6,697,172 B2 * | 2/2004 | Hirokawa | 358/404 |

FOREIGN PATENT DOCUMENTS

| | | |
|---|---|---|
| JP | 2-51968 | 2/1990 |
| JP | 5-14576 | 1/1993 |
| JP | 6105058 | 4/1994 |
| JP | 6-244974 | 9/1994 |
| JP | 9-65034 | 3/1997 |
| WO | WO9616506 A1 | 5/1996 |

* cited by examiner

| HOUR | NUMBER OF COMMUNICATIONS PERFORMANCE |
|---|---|
| 0 | 12 |
| 1 | 5 |
| 2 | 0 |
| 3 | 0 |
| ⋮ | 0 |
| 7 | 10 |
| 8 | 20 |
| 9 | 23 |
| 10 | 22 |
| 11 | 19 |
| 12 | 22 |
| ⋮ | ⋮ |
| 23 | 10 |

| HOUR | LINE VACANCY TIME (MINUTE) |
|---|---|
| 0 | 20 |
| 1 | 40 |
| 2 | 60 |
| 3 | 60 |
| ⋮ | 60 |
| 7 | 30 |
| 8 | 1 |
| 9 | 2 |
| 10 | 2 |
| 11 | 3 |
| 12 | 5 |
| ⋮ | ⋮ |
| 23 | 20 |

| MEMORY (%) | MONTHLY RATE (%) |
|---|---|
| 0-9 | 2 |
| 10-19 | 22 |
| 20-29 | 12 |
| 30-39 | 13 |
| 40-49 | 16 |
| 50-59 | 3 |
| ⋮ | ⋮ |
| ⋮ | ⋮ |
| 90-100 | 1 |

| FUNCTION NO. | NUMBER OF MONTHLY USE |
|---|---|
| 0 | 120 |
| 1 | 214 |
| 2 | 300 |
| 3 | 12 |
| 4 | 0 |
| 5 | 0 |
| ⋮ | ⋮ |
| ⋮ | ⋮ |
| 10 | 90 |

METHOD FOR MONITORING PERFORMANCE OF IMAGE FORMING APPARATUS

This application is a Rule 1.53(b) continuation, and claims the priority, of U.S. Ser. No. 09/159,217, filed Sep. 23, 1998 now U.S. Pat. No. 6,697,172, the entire contents of which is herein incorporated by reference.

BACKGROUND

1. Technical Field

This disclosure relates to a method for monitoring performance of an image forming apparatus, and an image forming apparatus which is capable of monitoring its own performance.

2. Description of the Related Art

There has been developed a facsimile apparatus that is capable of automatically generating a performance report at established periods. Users are able to anticipate the conditions of the facsimile machine by checking the performance report. If the performance report indicates abnormal conditions of the facsimile machine, the users may contact a service center of the machines.

A facsimile machine which is disclosed in Japanese Unexamined Patent Application No. 6-105058 (1994) is capable of automatically generating a user list in addition to the above-mentioned performance report. The user list indicates users who use the facsimile machine in an established period, and these users are indicated correspondingly in the performance report as well.

Another facsimile machine which is disclosed in Japanese Unexamined Patent Application No. 9-65034 (1997) is capable of generating a file broadcast report on demand during a file broadcast operation. With such a file broadcast report, users can check the current status of the file broadcast being performed.

Accordingly, users can benefit from such convenient reporting functions. However, the reporting functions are not sufficient for a service center to grasp the detailed conditions of a plurality of facsimile machines. To trace the details, the service center may need to dispatch a service personnel to the sites where the facsimile machines are installed.

It is believed that there is no system available that allows the service center to automatically read the performance conditions of the facsimile machine, avoiding a journey by the service personnel.

SUMMARY

The present disclosure provides an image forming apparatus which is operatively connected to a central data processing apparatus. In an exemplary embodiment, the image forming apparatus is configured as a facsimile apparatus and includes a performance measuring mechanism, a memory, a data reading mechanism, and a data transfer mechanism. The performance measuring mechanism measures at least one performance related to facsimile operations. The memory that stores data of measurements on the at least one performance measured by the performance measuring mechanism. The data reading mechanism that receives a request for data transmission and that, in response to the request, reads the data of measurements on the at least one performance stored in the memory. The data transfer mechanism that transfers the data read by the data reading mechanism to the central data processing apparatus.

The performance measuring mechanism may measure, on an hourly basis, a number of times of facsimile communications that have been performed and a time of line vacancy.

The performance measuring mechanism may measure a usage rate of a memory included in the facsimile apparatus.

The performance measuring mechanism may keep counts of recording sheets that have been used for printing received facsimile messages on and of occurrences that the recording sheets are spent out.

The function usage measuring mechanism may keep counts of times that each facsimile function provided to the facsimile apparatus is used.

The facsimile apparatus may be connected to the central data processing apparatus via a telephone line network.

The facsimile apparatus and the central data processing apparatus may perform communications operations in accordance with a group 3 facsimile protocol.

The present disclosure also provides a performance monitoring system. In an exemplary embodiment, the system includes a central data processing apparatus and a plurality of facsimile apparatus and each facsimile apparatus includes a performance measuring mechanism, a memory, a data reading mechanism, and a data transfer mechanism. The performance measuring mechanism measures at least one performance related to facsimile operations. The memory that stores data of measurements on the at least one performance measured by the performance measuring mechanism. The data reading mechanism that receives a request for data transmission and that, in response to the request, reads the data of measurements on the at least one performance stored in the memory. The data transfer mechanism that transfers the data read by the data reading mechanism to the central data processing apparatus.

The performance measuring mechanism may measure, on an hourly basis, a number of times of facsimile communications that have been performed and a time of line vacancy.

The performance measuring mechanism may measure a usage rate of a memory included in the facsimile apparatus.

The performance measuring mechanism may keep counts of recording sheets that have been used for printing received facsimile messages on and of occurrences that the recording sheets are spent out.

The function usage measuring mechanism may keep counts of times that each facsimile function provided to the facsimile apparatus is used.

The facsimile apparatus may be connected to the central data processing apparatus via a telephone line network.

The facsimile apparatus and the central data processing apparatus may perform communications operations in accordance with a group 3 facsimile protocol.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIGS. 4(A) and 4(B) are diagrams of exemplary communications performance and line vacancy time tables, respectively, included in the status memory of FIG. 3;

FIG. 5 is a diagram of an exemplary memory occupancy table included in the status memory of FIG. 3;

FIG. 6 is a diagram of an exemplary function usage table included in the status memory of FIG. 3.

DETAILED DESCRIPTION

In describing examples and exemplary embodiments of the present disclosure with reference to the drawings, specific terminology is employed for the sake of clarity. However, the disclosure and appended claims are not intended to be limited by the specific terminology so selected and it is to be understood that each specific element includes all technical equivalents which operate in a similar manner.

Figure 1:
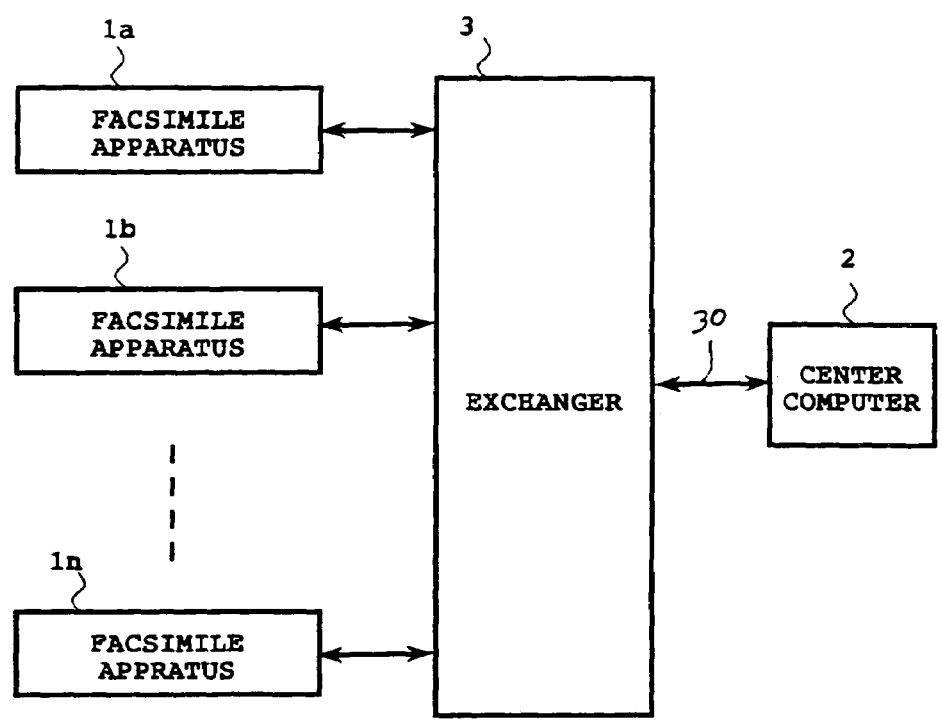
FIG. 1 is a block diagram of a facsimile performance monitoring system including a plurality of facsimile apparatuses, according to an exemplary embodiment of the present disclosure.

Referring now to the drawings, wherein like reference numerals designate identical or corresponding parts throughout the several views, FIG. 1 illustrates a general configuration of an exemplary facsimile machine monitoring system. The facsimile machine monitoring system of FIG. 1 includes n units of facsimile apparatus including facsimile apparatus 1a, 1b, and 1n, a central computer 2, an exchanger 3, and a public switched telephone network (PSTN) 30. The public switched telephone network (PSTN) 30 of FIG. 1 may be another network such as a private line network, for example.

As illustrated in FIG. 1, each of the n units of the facsimile apparatus is connected to the exchanger 3 and operatively to the central computer 2 via the public switched telephone network (PSTN) 30. As each of the n units of the facsimile apparatus of FIG. 1 has a configuration and functions similar to others, a description to one specific facsimile apparatus among the n units may be applied to any of the n units.

Figure 2:
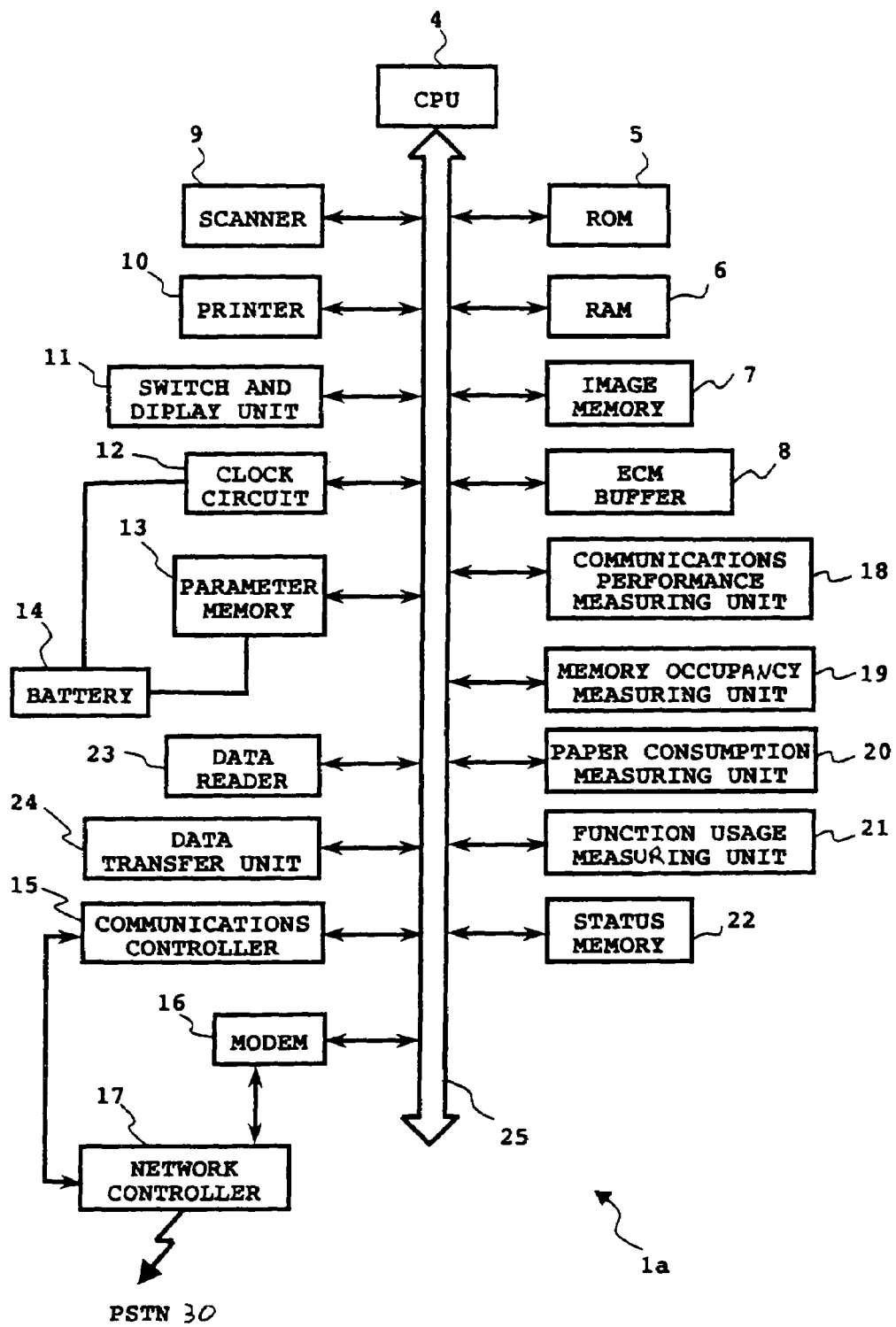
FIG. 2 is a block diagram of the facsimile apparatus included in the electronic communications system of FIG. 1.

As illustrated in FIG. 2, the facsimile apparatus 1a of FIG. 1, for example, includes a CPU (central processing unit) 4, a ROM (read only memory) 5, a RAM (random access memory) 6, an image memory 7, and an ECM (error correction mode) buffer 8. The CPU 4 controls the entire operation of the facsimile apparatus. The ROM 5 stores various kinds of programs. The RAM 6 stores various kinds of data. The image memory 7 stores image data. The ECM buffer 8 stores data during a data transmission operation under an ECM mode.

The facsimile apparatus 1a further includes a scanner 9, a printer 10, a switch and display unit 11, a clock circuit 12, a parameter memory 13, a battery 14, a communications controller 15, a modem 16, and a network controller 17. The scanner 9 reads an image of a document at a predetermined resolution. The printer 10 produces an image output at a predetermined resolution. The switch and display unit 11 includes various kinds of operational keys and indications for interfacing between an operator and the facsimile apparatus. The clock circuit 12 maintains the present time and counts time periods in accordance with instructions by the CPU 4. The parameter memory 13 stores various kinds of data including system property data, registration data, and so forth.

The battery 14 supplies battery power to the clock circuit 12 and the parameter memory 13. The communications controller 15 controls the communications operation. The modem 16 is preferably a Group 3 facsimile modem that performs the functions of a modem for the Group 3 facsimile machine. The network controller 17 includes an automatic transmitting and receiving function and controls the connection of the facsimile apparatus to the public switched telephone network 30, via the exchanger 3. The network controller 17 is connected to the communications controller 15 and the modem 16. The network controller 17 is also connected to the public switched telephone network (PSTN) 30.

Further, the facsimile apparatus 1a includes a communications performance measuring unit 18, a memory occupancy measuring unit 19, a paper consumption measuring unit 20, a function usage measuring unit 21, a status memory 22, a data reader 23, a data transfer unit 24, and a system bus 25. The system bus 25 is connected to all of the above-mentioned units of the facsimile apparatus 1a, except for the battery 14 and the network controller 17, as illustrated in FIG. 2.

The communications performance measuring unit 18 measures communications performance information such as the number of communications performances and the time (e.g. minute) of line vacancy for each hour, for example, using the clock circuit 12. The memory occupancy calculator 19 calculates the usage rates of memories such as the image memory 7 on a monthly basis, for example. The paper consumption measuring unit 20 keeps count of the number of pages printed by the printer 10 in a month, for example, and of times when the paper is out. The function usage measuring unit 21 measures the usage of functions provided to the facsimile apparatus 1a.

Figure 3:
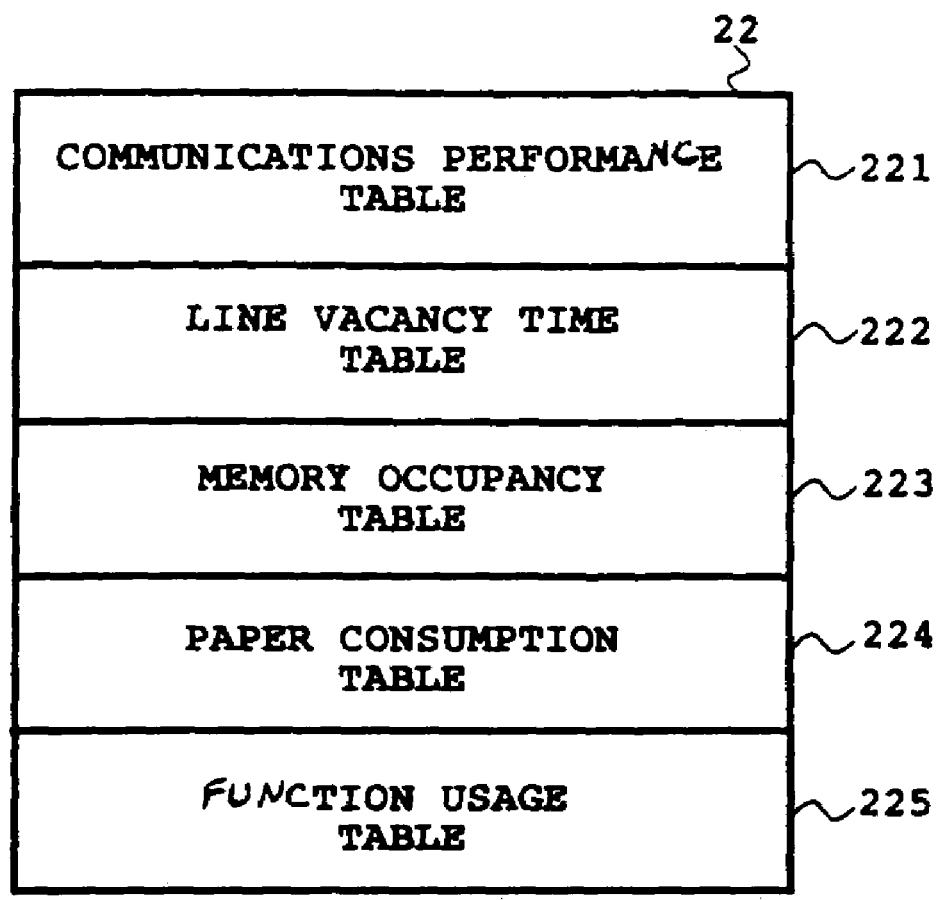
FIG. 3 is a diagram of an exemplary status memory included in the facsimile apparatus of FIG. 2.

The status memory 22 includes, as shown in FIG. 3, a communications performance table 221, a line vacancy time table 222, a memory occupancy table 223, a paper consumption table 224, and a function usage table 225. The communications performance table 221 stores the number of communications performances measured by the communications performance measuring unit 18. The line vacancy time table 222 stores the time (e.g., in minutes) of line vacancy measured by the communications performance measuring unit 18. The memory occupancy table 223 stores the usage rates of memories measured by the memory occupancy calculator 19. The paper consumption table 224 stores the paper consumption data measured by the paper consumption measuring unit 20. The function usage table 225 stores the function usage data measured by the function usage measuring unit 21.

The data reader 23 reads various kinds of information stored in the status memory 22 in response to a data transfer request from the central computer 2 and transfers the data to the data transfer unit 24. The data transfer unit 24 that receives the data from the data reader 23 compresses the data and transfers the compressed data to the central computer 2 via the communications controller 15 and the network controller 17.

In the facsimile apparatus 1a, the communications performance measuring unit 18 continuously measures the number of communications performances and the time (e.g., in minutes) of line vacancy, and stores the respective output data into the communications performance table 221 and the line vacancy time table 222 of the status memory 22, on an hourly basis, for example. An example of the communications performance table 221 is shown in FIG. 4(A), in which the number of communications performances which have been performed are stored on an hourly basis. An example of the line vacancy time table 222 is shown in FIG. 4(B), in which the time of line vacancy in units of minutes is stored on an hourly basis.

The memory occupancy measuring unit 19 continuously monitors the use of memories such as the image memory 7, and calculates the usage rates thereof. The unit 19 then stores the usage rates into the memory occupancy table 223. As shown in FIG. 5, the memory occupancy table 223 has a memory-in-use column (%) in which the total memory capacity is equally divided into 10 sections as an example, and a corresponding monthly usage rate column (%). This table 223 indicates a distribution of the memory usage rates in a month.

The paper consumption measuring unit 20 monitors the performance of the printer 10 and keeps count of pages that are used by the printer 10 each time facsimile information arrives. The unit 20 also keeps count of the occurrence of paper out. These measurements are summed on a monthly basis, for example, and stored in the paper consumption table 224 of the status memory 22.

The function usage measuring unit 21 that monitors the usage of the facsimile functions, such as a broadcast function, keeps counts of the number of times that each function is used. This measurement is performed on a monthly basis, for example. As shown in FIG. 6, the outputs from the unit 21 are stored, function by function, into the function usage table 225 of the status memory 22.

As described above, each of the n units of the facsimile apparatus of FIG. 1, including the facsimile apparatus 1a, 1b, and 1n, is provided with a plurality of performance measuring functions.

Figure 7:
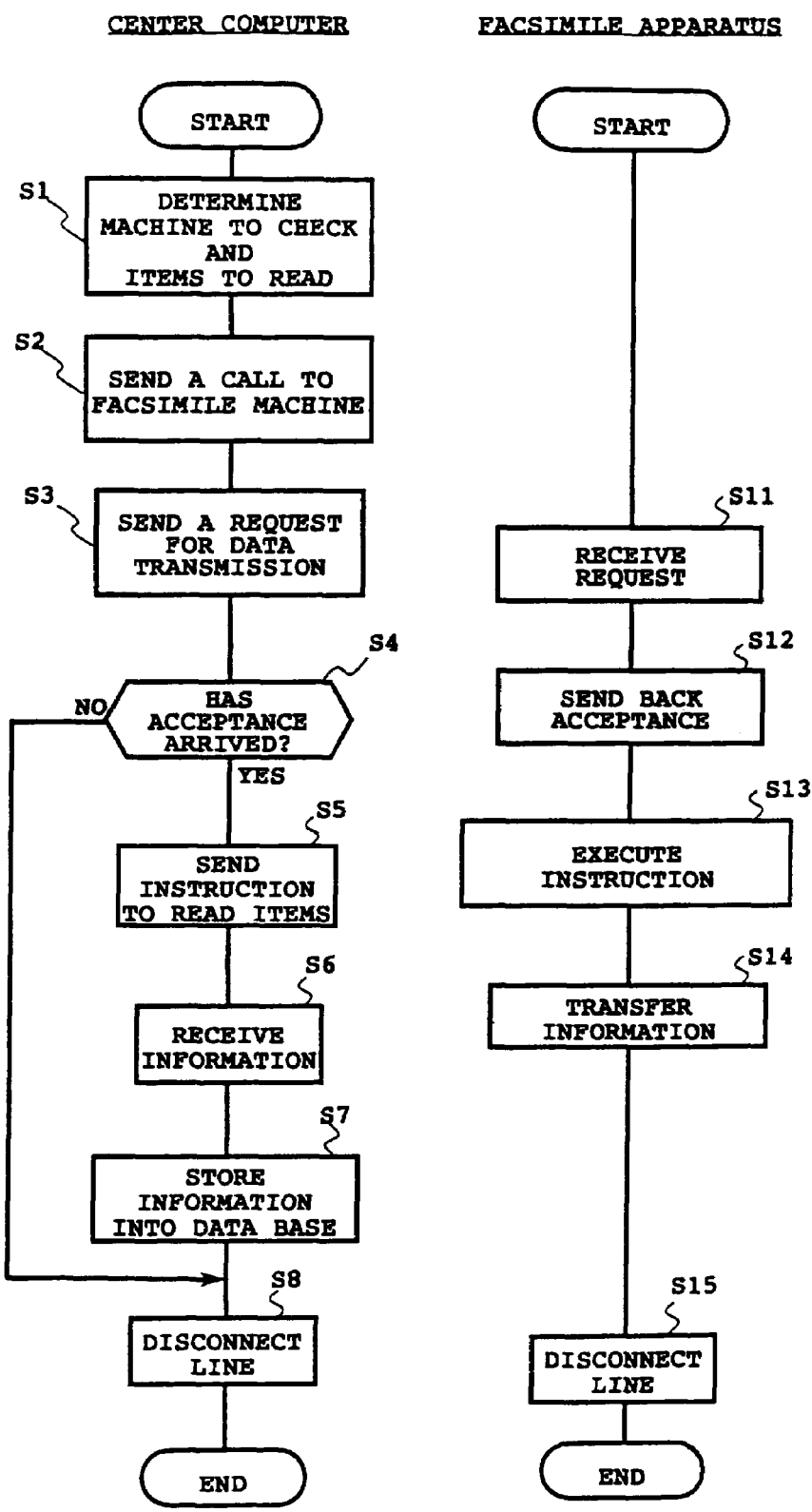
FIG. 7 is a flowchart of an exemplary operation of the facsimile performance monitoring system illustrated in FIG. 1.

Next, exemplary operations of the central computer 2 and the facsimile apparatus during the time of transmission of the performance measurements from the facsimile apparatus to the central computer 2 are explained with reference to FIG. 7. In Step S1 of FIG. 7, the central computer 2 determines which facsimile apparatus to access and items of measurements to read. The central computer 2 then sends a call to the facsimile apparatus 1a, for example, in Step S2, and sends a request signal for an NSF (non-standard facilities) transmission in Step S3. Then, at the facsimile apparatus 1a, the CPU 4 receives the request signal for the NSF transmission in Step S11 and sends back an acceptance signal of the NSF transmission to the central computer 2 in Step S12.

The central computer 2, in Step S4, checks for receipt of an acceptance signal from the facsimile apparatus 1a. If the central computer 2 receives an acceptance signal from the facsimile apparatus 1a and the check result of Step S4 is YES, the central computer 2 sends an instruction signal for a start of transmission to the facsimile apparatus 1a in Step S5.

In Step S13, the facsimile apparatus 1a receives the instruction signal for a start of transmission from the central computer 2 and instructs the data reader 23 to read the measurement items which are designated by the central computer 2. Then, in Step S14, the data reader 23 reads the information of the designated measurement items from the respective information tables of the status memory 22, and subsequently sends the read information to the data transfer unit 24. Further, in Step S14, upon receiving the information from the data reader 23, the data transfer unit 24 compresses the information and sends the compressed information to the central computer 2 through the communications controller 15 and the network controller 17.

In Step S6, the central computer 2 receives the compressed information from the facsimile apparatus 1a. Then, in Step S7, the central computer 2 decompresses the received information in order to obtain the data of the designated measurements, and stores the data into a memory dedicated for storing information relating to facsimile apparatus 1a. Then, the central computer 2 and the facsimile apparatus 1a in turn disconnect the line in Steps S8 and S15, respectively.

If for any reason the central computer 2 receives no acceptance signal from the facsimile apparatus 1a and the check result of Step S4 is NO, the process proceeds to Step S8 to cancel the operation. Then, the central computer 2 and the facsimile apparatus 1a in turn disconnect the line in Steps S8 and S15, respectively.

The central computer 2 performs the above-described operations for all of the n units of the facsimile apparatus, thereby obtaining the measurement information for all the facsimile apparatuses connected to the facsimile machine monitoring system of FIG. 1.

With the above-described operations on the facsimile machine monitoring system of FIG. 1, the performances of the n units of the facsimile apparatus can be observed in detail so that appropriate services can be provided to each of units in accordance with their conditions.

The examples and exemplary embodiments described herein may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The subject matter of present disclosure may also be implemented by die preparation of application specific integrated circuits or by interconnecting an appropriate network of conventional component circuits, as will be readily apparent to those skilled in the art.

This disclosure is based on Japanese Patent Application No. JPAP09-278036 filed Sep. 26, 1997, the entire contents of which are incorporated herein by reference.

Numerous additional modifications and variations of the present disclosure are possible in light of the above teachings. It is therefore to be understood that within die scope of the appended claims, the present application may be practiced otherwise than as specifically described herein. For example, elements and/or features of different examples and illustrative embodiments may be combined with each other and/or substituted for each other within the scope of this disclosure and appended claims.

What I claim is:

1. A method for monitoring performance of an image forming apparatus, said method comprising:
    (a) continuously monitoring use of an image memory of the image forming apparatus, and calculating a memory usage rate of the image forming apparatus, wherein the memory usage rate is a percentage of a time period that a percentage of the image memory in use during said time period is within a corresponding predetermined range of percentages;
    (b) storing performance measurement data corresponding to said memory usage rate calculated in (a);
    (c) receiving a request for data transmission from a central data processing apparatus and in response to said request, reading said measurement data stored in (b) relating to said memory usage rate; and
    (d) transferring said data read in (c) to said central data processing apparatus.

2. The method of claim 1, wherein said image forming apparatus is connected to said central data processing apparatus via a telephone line network.

3. The method of claim 1, wherein said image forming apparatus and said central data processing apparatus perform communications operations in accordance with a group 3 facsimile protocol.

4. A method for monitoring performance of an image forming apparatus, said method comprising:
    (a) providing a function usage measuring pan in the image forming apparatus to monitor each image forming function of the image forming apparatus, and maintain a corresponding count of a number of times that the image forming function of the image forming apparatus has been used;

(b) storing, in a storage part of the image forming apparatus, performance measurement data corresponding to said image forming function usage counts maintained in (a);

(c) receiving, from a central data processing apparatus through a network, a request for data transmission and in response to said request, reading, from said storage part of the image forming apparatus, said performance measurement data stored in (b) relating to said function usage counts; and (d) transferring, from said image forming apparatus through said network, said performance measurement data read in (c) to said central data processing apparatus.

5. The method of claim 4, wherein said image forming apparatus is connected to said central data processing apparatus via a telephone line network.

6. The method of claim 4, wherein said image forming apparatus and said central data processing apparatus perform communications operations in accordance with a group 3 facsimile protocol.

7. A method for monitoring performance of an image forming apparatus, said method comprising:

(a) providing a performance measuring part in the image forming apparatus to measure for each predetermined period of time a number of times that facsimile communications were performed by the image forming apparatus during said predetermined period of time;

(b) storing, in a storage part of the image forming apparatus, performance measurement data including said measured number of times that facsimile communications were performed during said predetermined period or time, measured in (a);

(c) receiving, from a central data processing apparatus through a network, a request for data transmission and in response to said request, reading, from said storage part of the image forming apparatus, said performance measurement data stored in (b) relating to said amount of time of line vacancy; and (d) transferring, from said image forming apparatus through said network, said performance measurement data read in (c) to said central data processing apparatus.

8. The method of claim 7, wherein said image forming apparatus is connected to said central data processing apparatus via a telephone line network.

9. A method for monitoring performance of an image forming apparatus, said method comprising:

(a) providing a performance measuring part in the image forming apparatus to monitor time vacancy of the image forming apparatus and measuring an amount of time of line vacancy;

(b) storing, in a storage part of the image forming apparatus, performance measurement data corresponding to said amount of time of line vacancy measured in (a);

(c) receiving, from a central data processing apparatus through a network, a request for data transmission and in response to said request, reading, from said storage part of the image forming apparatus, said performance measurement data stored in (b) relating to said amount of time of line vacancy; and (d) transferring, from said image forming apparatus through said network, said performance measurement data read in (c) to said central data processing apparatus.

10. The method of claim 9, wherein said image forming apparatus is connected to said central data processing apparatus via a telephone line network.

11. An image forming apparatus operatively connected through a network to a central processing apparatus, said apparatus comprising:

a performance measuring mechanism configured to continuously monitor use of an image memory and calculate a memory usage rate of the image forming apparatus;

a status memory configured to store performance measurement data including said memory usage rate calculated by said performance measuring mechanism;

a data reading mechanism configured to receive from a central data processing apparatus through a network a request for data transmission and in response to said request, read said performance measurement data relating to said memory usage rate from said status memory; and a data transfer mechanism that configured to transfer said performance measurement data read by said data reading mechanism through said network to said central processing apparatus.

12. An image forming apparatus operatively connected through a network to a central processing apparatus, said image forming apparatus comprising:

a function usage measuring part configured to monitor each image forming function of the image forming apparatus and maintain a corresponding count of a number of times that the image forming function of the image forming apparatus has been used;

a memory configured to store performance measurement data including the image forming function usage counts;

a data reading mechanism configured to receive from a central data processing apparatus through a network a request for data transmission and that, in response to said request, reads said performance measurement data relating to the function usage counts from said memory; and a data transfer mechanism that configured to transfer said performance measurement data read by said data reading mechanism through said network to said central processing apparatus.

13. An image forming apparatus operatively connected through a network to a central processing apparatus, said image forming apparatus comprising:

a performance measuring mechanism configured to maintain a count of a number of times that communications were performed by the image forming apparatus in a predetermined period of time;

a memory configured to store performance measurement data including said count of the number of times chat communications were performed in said predetermined period of time;

a data reading mechanism configured to receive from a central data processing apparatus through a network a request for data transmission and that, in response to said request, reads said performance measurement data relating to said amount of time of line vacancy from said memory; and a data transfer mechanism that configured to transfer said performance measurement data read by said data reading mechanism through said network to said central processing apparatus.

14. An image forming apparatus operatively connected through a network to a central processing apparatus, said image forming apparatus comprising:

a performance measuring mechanism configured to monitor line vacancy of the image forming apparatus and measure an amount of time of line vacancy;

a memory configured to store performance measurement data including said amount of time of line vacancy measured by said performance measuring mechanism;

a data reading mechanism configured to receive from a central data processing apparatus through a network a request for data transmission and that, in response to said request, reads said performance measurement data relating to said amount of time of line vacancy from said memory; and a data transfer mechanism that configured to transfer said performance measurement data read by said data reading mechanism through said network to said central processing apparatus.

15. An image forming apparatus operatively connected through a network to a central processing apparatus, said image forming apparatus comprising:

a performance measuring mechanism configured to monitor a number of recording sheets that have been used for image forming operations of the image forming apparatus and maintain a count of a number of occurrences that the recording sheets are spent out;

a memory configured to store performance measurement data including said count of the number of occurrences that the recording sheets are spent out;

a data reading mechanism configured to receive from a central data processing apparatus through a network a request for data transmission and that, in response to said request, reads said performance measurement data relating to said count of the number of occurrences that the recording sheets are spent out; and a data transfer mechanism that configured to transfer said performance measurement data read by said data reading mechanism through said network to said central processing apparatus.

16. A method for monitoring performance of an image forming apparatus, said method comprising:

(a) providing a performance measuring part in the image forming apparatus to a monitor a number of recording sheets that have been used for image forming operations of the image forming apparatus and maintain a count of a number of occurrences that the recording sheets are spent out;

(b) storing, in a storage part of the image forming apparatus, performance measurement data including said count of the number of occurrences that the recording sheets are spent out maintained in (a);

(c) receiving, from a central data processing apparatus through a network, a request for data transmission and in response to said request, reading, from said storage part of the image forming apparatus, said performance measurement data stored in (b) including said count of the number of occurrences that the recording sheets are spent out; and (d) transferring, from said image forming apparatus through said network, said performance measurement data read in (c) to said central data processing apparatus.

* * * * *